INVENTOR
CHARLES GEORGE NEUROTH

BY  Marion D. Ford

ATTORNEY

United States Patent Office 3,505,099
Patented Apr. 7, 1970

3,505,099
METHOD FOR BONDING ROOM TEMPERATURE CURABLE SILICONE RUBBER TO VARIOUS SUBSTRATES
Charles George Neuroth, Blissfield, Mich., assignor, by mesne assignments, to Stauffer-Wacker Silicone Corporation, a corporation of Delaware
Filed Jan. 2, 1968, Ser. No. 695,234
Int. Cl. B32b 15/06, 25/02; B44d 1/092
U.S. Cl. 117—71         20 Claims

ABSTRACT OF THE DISCLOSURE

A method for bonding a room temperature curable silicone rubber to a substrate which comprises applying a zinc dust primer composition to the substrate, coating the dried primer composition with an acyloxysilane and thereafter applying a room temperature curable silicone rubber to the primed substrate.

---

This invention relates to a silicone rubber coated substrate, particularly to a composition for bonding room temperature curable silicone rubber to a substrate and more particularly to a method for bonding a room temperature curing silicone rubber to a metal substrate.

Heretofore, silicone rubber was a well known product which has excellent properties such as themal stability, dielectric properties, resistance to atmospheric deterioration, chemical inertness, non-toxicity and retention of properties over extreme temperature ranges. The wide variety of uses for silicone rubber has inevitably lead to a search for methods for anchoring or bonding silicone rubber to solid substrates in order to obtain the benefit of these desirable properties. The use of various primers, cements and other intermediate adhesive layers between silicone rubber and base materials has been proposed. Some of the methods are quite effective for bonding silicone rubber to some base materials where heat is employed, yet are ineffective for bonding room temperature curing silicone rubber to base materials. Other methods have secured a degree of bonding of room temperature curing silicone rubber but introduce undesirable characteristics such as thermal instability and etc.

Also, when bonding room temperature curable silicone rubber to metal substrates, the by-product resulting from the curing of the silicone rubber will often cause corrosion between the rubber and the metal substrate, thereby destroying the bond between the rubber and the substrate.

It is therefore an object of this invention to provide primers for solid substrates. Another object of this invention is to provide a simple method for bonding a room temperature curable silicone rubber to a solid substrate. Still another object of this invention is to provide a method of obtaining a strong durable bond between room temperature curable silicone rubber and a metal substrate. A future object of this invention is to provide a metal substrate which is non-corrosive to the by-products formed during the curing of room temperature curable silicone rubber. A still further object of this invention is to provide a method for bonding a silicone rubber to a metal substrate in the absence of heat.

The foregoing objects and others which will become apparent from the following discussion are accomplished in accordance with this invention, generally speaking, by providing a method for bonding room temperature curable silicone rubber to metal substrates.

More specifically, this invention relates to a method for bonding room temperature curable silicone rubber to a metal substrate which comprises depositing on the solid substrate a zinc dust primer composition consisting of a pre-condensed tetraalkoxysilane having a silica content upwards of 35 percent, water in an amount to provide from 0.15 to 0.5 mole of $H_2O$ for each alkoxy group present in the tetraalkoxysilane condensate, a solvent and zinc powder, drying the coated substrate at a temperature sufficient to cure the coating and thereafter applying an overcoat of a room temperature curable organopolysiloxane.

By way of illustrating the present invention, reference may be had to the drawing in which.

Figure 1:
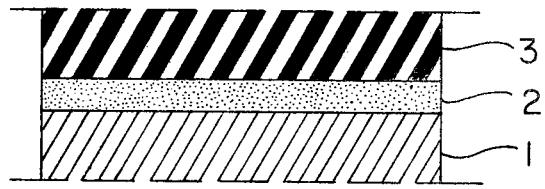
FIGURE 1 is a side elevational view illustrating a curable organopolysiloxane assembly having a layer of zinc dust primer interposed between the curable organopolysiloxane and a substrate.

The primer composition is based on a tetraalkoxysilane of the formula:

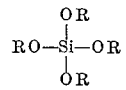

wherein R is a lower alkyl radical of not more tran 4 carbon atoms, i.e. methyl, ethyl, propyl, isopropyl, butyl and isobutyl.

Before the tetraalkoxysilane can be used in this invention, it must be pre-hydrolyzed and condensed to an extent such that the $SiO_2$ content of the condensate is at least 35 percent on a molecular weight basis. Especially good results have been obtained where the condensate contains up to about 40 percent $SiO_2$.

The tetraalkoxysilane may be prepared by reacting tetrachlorosilane with an alkanol, preferably in the presence of sufficient water to achieve the desired $SiO_2$ content in the product. Since the initial siloxane product does not contain the necessary amount of silica ($SiO_2$), an additional increment of water based on the desired silica content is added and the reaction allowed to continue under controlled conditions. Using the proper amount of water, the reaction which is one of further condensation is self-perpetuating. Thus, hydrolysis and condensation continues until the reaction is stopped by a known means or until a material is produced which is non-hydrolyzable under the particular condition.

In general, it is preferred to employ in the formation of the primer composition a condensate based on tetraethoxysilane, i.e. a condensate of tetraethyl orthosilicate, and as previously indicated particularly excellent results have been achieved where the tetraethoxysilane condensate has an $SiO_2$ content of the order of 40 percent based on the molecular weight.

The primer composition is then prepared by mixing the tetraalkoxysilane condensate of the selected $SiO_2$ content with additional water and an alkylene glycol alkyl ether solvent such as monoalkylene gycol monoalkyl ethers, dialkylene glycol monoalkyl ethers, dialkylene glycol dialkyl ethers and monoalkylene glyco dialkyl ethers which are miscible with water which have boiling points within the range of from 121° C. to 150° C. and flash points within the range of from 46° C. to about 74° C.

In preparing the primer composition, the water which is added to the tetraalkoxysilane condensate and the solvent should contain acid in an amount sufficient to give the mixture a pH of the range of about 1.4 to 3.5. Hydrochloric acid is generally used but other mineral acids such as sulfuric acid may be used either alone or in combination with hydrochloric acid. Also, organic acids, which possess the required strength, as well as metal chlorides, nitrates and sulfates, where the metal is a member of Groups III or IV of the Periodic Table, may be used. The purpose of the acid is to catalyze or further hydrolyze the pre-condensed tetraalkoxysilane. The degree of further hydrolysis of the tetraalkoxysilane condensate resulting from the addition of acidified water to the solvent mixture may lie within the range of 0.15 mole to 0.5 mole of water per each alkoxy group carried by the tetraalkoxysilane condensate.

The solvent to condensate ratio is not critical and subject to a wide variation depending upon the characteristics desired in the coating composition. Thus, the ratio of solvent to condensate may lie anywhere within the limits of from 0.5:1 to 10:1.

The amount of zinc dust may vary over a wide range, i.e. from about 10 to 90 percent based on the weight of the composition. Excellent results have been obtained where the zinc has been used in an amount of from about 10 to 50 percent based on the weight of the composition. The zinc dust may range in particle size from about 2 to 20 microns, preferably from about 2 to 10 and more preferably from about 2 to 6 microns.

The primer composition is applied to a metal surface as by spraying, dipping, brushing, wiping and the like and cured at any temperature from about 50° C. up to about 450° C. Where higher temperatures are used, the cure may be effected in about 10 seconds while lower temperatures may require relatively longer curing times. An organopolysiloxane which is curable at ambient moisture is then applied to the coated substrate. This provides the structure illustrated in FIGURE 1 where 1 is the substrate, 2 is the zinc dust primer and 3 is the curable organopolysiloxane.

Figure 2:
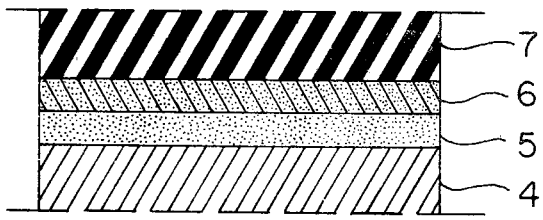
FIGURE 2 represents a side elevational view of a curable modified organopolysiloxane assembly having a layer of a zinc dust primer and a layer of an acyloxysilane interposed between the organopolysiloxane and a substrate.

In the case of bonding modified organopolysiloxanes to a substrate, generally speaking, a layer of the zinc dust primer which is overcoated with an acyloxysilane layer is interposed between the modified organopolysiloxane and substrate. This provides the structure illustrated in FIGURE 2 where 4 is the substrate, 7 is the curable modified organopolysiloxane and 5 and 6 are layers consisting of a zinc dust primer overcoated with an acyloxysilane; the layers being interposed between the substrate 4 and the modified organopolysiloxane 7.

The room temperature curable silicone rubbers are compositions comprising organopolysiloxanes having functional groups, most of which are attached to the terminal silicone atoms. Organopolysiloxanes, preferably hydroxyl-terminated organopolysiloxanes, which may be employed are represented by the formula:

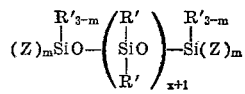

wherein $R'$, which may be the same or different, are monovalent hydrocarbon radicals, halogenated monovalent hydrocarbon radicals or cyanoalkyl radicals; Z represents hydroxyl and hydrolyzable groups; $m$ is an integer of from 1 to 3 and $x$ is an integer of from 0 to 20,000.

Also, modified organopolysiloxanes, preferably hydroxyl-terminated modified organopolysiloxanes, which may be used are represented by the formula:

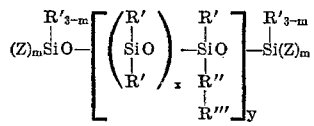

wherein $R'$, $Z$, $m$ and $x$ are the same as those described above; $R''$ is a divalent hydrocarbon radical; $R'''$ is a polymeric organic radical linked to $R''$ by a carbon-to-carbon linkage and $y$ is an integer of from 1 to 500.

As mentioned heretofore, Z represents hydroxyl and groups hydrolyzable in ambient moisture such as:

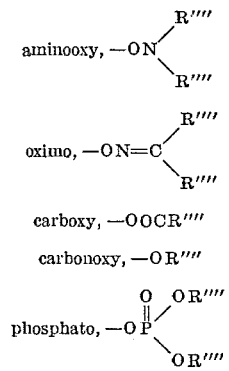

groups. The groups represented by $R''''$, which may be the same or different, are monovalent hydrocarbon radicals and halogenated monovalent hydrocarbon radicals. Suitable examples of aminooxy groups are dimethylaminooxy, diethylaminooxy, dibutylaminooxy, dioctylaminooxy, diphenylaminooxy, ethylmethylaminooxy, methylphenylaminooxy; oximo groups such as acetophenone oximo, acetoximo, benzophenone oximo, 2-butanone oximo, diisopropylketone oximo, chlorocyclohexanone oximo; carboxy groups such as acetoxy, propionyloxy, valeryloxy, caproyloxy, myristoyloxy, stearoyloxy and the like. Other hydrolyzable groups are carbonoxy groups such as methoxy, butoxy, heptoxy, octoxy, phenoxy and the like. Examples of phosphato groups are dimethylphosphato, diethylphosphato, dibutylphosphato, dioctylphosphato, methylethylphosphato, methylphenylphosphato, diphenylphosphato and the like.

The organopolysiloxanes employed in the formation of the modified organopolysiloxanes may be represented by the formula:

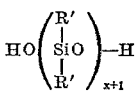

wherein $R'$ and $x$ are the same as those represented above.

The modified organopolysiloxanes consist of organopolysiloxane polymers having attached thereto at least one or more side chains or branches consisting of carbon-to-carbon chain polymers. In the formation of these modified polymers, hydrogen is abstracted from the organopolysiloxane polymers by a free-radical initiator to form an active site for grafting the carbon chain polymer thereto.

Any organopolysiloxane polymer may be used in this invention since these polymers are apparently capable of producing some free radicals or active sites under the proper conditions. However, the polymer should be one which is capable of producing a substantial and recognizable number of free radicals and it should be substantially free of any tendency to undergo further polymerization under the conditions employed. Thus, the polymer should be one which is substantially free of any aliphatic unsaturation; however, a low degree of any such unsaturation does not preclude the desired reaction. It is preferred that the organopolysiloxane polymer have lower alkyl groups attached to the silicon atoms since these are more amenable to hydrogen abstraction than other radicals.

Examples of suitable organopolysiloxane polymers and copolymers which may be used in the formation of the modified polymers are hydroxyl-terminated siloxane fluids (OH-Fluids), methylphenyl fluids, methylvinyl fluids and copolymers of dimethylsiloxane and phenyl-, methyl- or diphenylsiloxane units, Any polymerizable organic monomer having aliphatic olefinic bonds may be grafted to the organopolysiloxane polymers. Examples of suitable olefinic compounds are monomers and low molecular weight straight chained hydrocarbons such as ethylene, propylene, butylene; vinyl halides such as vinyl chloride, vinyl fluoride; vinyl esters of organic acids such as vinyl acetates, styrene, ring-substituted styrenes and other vinyl aromatics such as vinyl pyridine and vinyl naphthylene; acrylic acid and derivatives of acrylic acid including the salts, esters, amides and acrylonitriles; n-vinyl compounds such as n-vinyl carbazole, n-vinyl pyrrolidone and n-vinyl caprolactam and vinyl silicon compounds such as vinyltriethoxysilane.

Di-substituted ethylenes of the type $CH_2=CX_2$ may be used including vinylidene fluoride, vinylidene chloride, vinylidene cyanide, methacrylic and acid and compounds derived therefrom such as salts, esters and amides as well as methacrolein, methacrylonitrile and the like.

Examples of di-substituted ethylenes of the type $CHX=CHX$ such as vinylene carbonate and various monomers which polymerize best in the presence of other monomers, e.g. maleic anhydride, esters of maleic and fumeric acids, stilbene, indene and coumerone may be used in the formation of these modified polymers. As before indicated, the monomers may be used singly or in combinations of two or three or even more.

The grafting operation is most expeditiously effected by using a free-radical initiator, normally organic peroxides, although other free-radical initiators such as azo- compounds in which both the N atoms of the azo linkage are attached to a tertiary-carbon atom and the remaining valences of the tertiary-carbon atom are satisfied by nitrile, carboxyalkyl, cycloalkylene or alkyl radicals, preferably having from 1 to 18 carbon atoms. In addition to the above mentioned initiators, radiation may also be used to bring about the formation of free-radicals.

The most suitable peroxide initiators are hydroperoxides such as tertiary-butyl hydroperoxide, cumene hydroperoxide, decylene hydroperoxide; dialkyl peroxides such as di-tertiarybutyl and dicumyl peroxides; cyclic peroxides such as 1,5-dimethylhexane-1,5-peroxide and peresters such as tertiary-butylperbenzoate, tertiary-butylperoxyisopropylcarbonate and tertiary-butylperoctoate.

The amount of free-radical initiator used is not critical and thus, any amount capable of producing a perceptible degree of grafting is suitable. Generally, as low as 0.05 percent of the more active peroxide initiator based on the weight of the monomer is adequate in most cases.

Although the temperature employed in the grafting step is not critical, it has been found that temperatures from about 20° to about 160° C. are suitable for grafting hydrocarbons to the organopolysiloxane polymers.

The organopolysiloxane compositions may be cured by reacting hydroxyl-terminated organopolysiloxanes with a silane of the formula $$X_{4-t}SiY_t$$

wherein X is a relative inert group such as an alkyl, alkoxy or aryl group; Y is an acyloxy, oximo, alkoxy, aminooxy, halogen or phosphato group and $t$ is an integer of from 3 to 4. The hydroxyl groups are replaced by polyfunctional groups of the type $$OSiX_{4-t}\Delta_{t-1}$$

Examples of these silanes are methyltriacetoxysilane, isopropoxytriacetoxysilane, methyltriacetoximosilane, methyl - tris - diethylaminooxysilane, methyl-tris(diethylphosphato)silane and the like.

Generally, the silane curing agent is added to the hydroxyl-terminated organopolysiloxane, whereby the hydroxyl groups are converted to functional groups which are hydrolyzable at ambient moisture. These compositions may be cured by merely exposing them to atmospheric moisture with or without any additional water vapor.

In addition, the hydroxyl-terminated organopolysiloxanes may be cured by reacting these organopolysiloxanes in the presence of catalysts and curing agents such as polyalkoxysilanes of the formula:

$$(X'O)_zSi(Y')_{4-z}$$

or polyalkoxysiloxanes in which the silicon atoms are linked through Si—O—Si bonds and the remaining vallences of the silicon atoms are satisfied by X'O and/or Y' to form compositions which are curable at ambient moisture.

In the above formula, the groups represented by X' are monovalent hydrocarbon radicals having less than 8 carbon atoms while represented by Y' are monovalent hydrocarbon radicals or halogenated hydrocarbon radicals of less than 8 carbon atoms and $z$ has a value of from 3 to 4. Examples of monovalent hydrocarbon radicals represented by X' are methyl, ethyl, propyl, butyl, hexyl, octyl, phenyl, vinyl, allyl, ethylallyl, butadienyl and the like. Radicals represented by Y' may be the same as the radicals represented by R'' above, as well as the corresponding halogenated groups such as chloromethyl, 2-bromo-4,6-diiodophenyl, 1,2-fluorovinyl, 3,4-difluorocyclopentyl, 2-bromocyclopentene-2,3-yl and 6-chlorohexyl. The polyalkoxysilanes employed herein include mono-organotrihydrocarbonoxysilane, tetrahydrocarbonoxysilanes, e.g. orthosilicates and partial hydrolyzates of such silanes. The polyalkoxy compounds, e.g. ethyl orthosilicate or partial hydrolyzed ethyl silicates such as ethyl silicate "40" which consist primarily of decaethyl tetrasilicate are representative of these compounds. Examples of other operative alkyl silicates are ethyltrimethoxysilane, methylbutoxydiethoxysilane, propyltripropoxysilane, methyltriethoxysilane, ethyltriethoxysilane, ethyl orthosilicate and n-butyl orthosilicate. Examples of alkylpolysilicates are ethylpolysilicate, isopropylpolysilicate and butylpolysilicate, dimethyltetraethoxydisiloxane, trimethylpentabutoxytrisiloxane and the like.

The polyalkoxysilanes and polyalkoxysiloxanes employed herein may be used either alone or in combination and should be used in a proportion of from about 0.5 to about 10 percent, preferably from about 1 to 5 percent weight based on the weight of the organopolysiloxane. If the total weight of the polyalkoxysilanes or polyalkoxysiloxanes is below about 0.5 percent based on the weight of the organopolysiloxane, very little cross-linking occurs. If, on the other hand, the total weight of the polyalkoxysilanes or polyalkoxysiloxanes is above about 10 percent based on the weight of the organopolysiloxane, the curing time will not be substantially reduced. However, a large excess of cross-linking agent insures complete reaction with all silicon bonded hydroxyl groups and in addition acts as a scavenger for any moisture which may be present.

As mentioned heretofore, these compositions are cured by mixing the hydroxyl-terminated organopolysiloxanes with the polyalkoxysilane or polyalkoxysiloxane in the presence of a curing catalyst. Examples of suitable catalysts are the metal salts of carboxylic acids which include carboxylic acid salts of lead, tin, zirconium, iron, cadmium, titanium, calcium and manganese. It is preferred that the carboxylic acid salts of the above metals be characterized by the properties that the carboxylic acid radical contain less than 14 carbon atoms and preferably from 3 to 14 carbon atoms. Also, it is preferred that the salt be soluble in the organopolysiloxanes, although insoluble salts can be employed if they are properly dispersed in the system. Typical of the metal salts of carboxylic acids which are operative are the naphthenates, propenates, butyrates, hexanates, oleates, benzoates, laurates, linoleates, stearates and octoates of the above metals. Also, tin compounds such as bis(acetoxybutylphenyltin)oxide, bis(acetoxydibutyltin)oxide, bis(dimethyloctyltin)oxide, bis(tribenzotin)oxide, bis(tributyltin)oxide, benzylbutylphenyltin hydroxide, di-tertiarybutylchlorotin hydroxide and the like may be used as curing catalysts. These catalysts may be dispersed in an inert solvent and then added to the organopolysiloxane or they may be dispersed on a filler and thereafter milled with the organopolysiloxane. Examples of suitable hydrocarbon solvents are benzene, toluene, xylene and the like; halogenated hydrocarbons such as perchloroethylene or chlorobenzene; organic ethers such as diethyl ether, dibutyl ether and the like or fluid hydroxyl-free polysiloxanes. It is preferred that the solvents be of sufficient volatility to vaporize off at a very low temperature.

The catalysts used in these curing systems are effective in minimal amounts, e.g. from about 0.05 to about 2.0 percent, preferably from about 0.1 to about 1.0 percent by weight based on the weight of the composition. A mixture of two or more of the catalysts may be used, if desired. The amount of catalyst added to the composition is determined primarily by the pot-life or working time desired.

The organopolysiloxane compositions may be compounded in the usual manner for preparing conventional siloxane elastomers, however, before the materials are stored prior to use, it is essential that the catalyst or curing agent such as the polyalkoxysilane or polyalkoxysiloxane be stored separately. In other words, the hydroxyl-terminated organopolysiloxane, curing agent and filler, where desired may be compounded and the catalyst added just prior to use. In another method, the organopolysiloxane, catalyst and filler, where desired, may be compounded and then the curing agent added just prior to use. If an inert filler is used, it may be added either to the organopolysiloxane or the curing agent prior to the addition of the catalyst or immediately after the reactants have been combined.

Upon mixing the ingredients, the composition cures spontaneously in the presence of atmospheric moisture at room temperature to form an elastomeric material.

Although it is not essential, oftentimes it is preferred that fillers be incorporated in these compositions in order to impart desirable physical properties. Examples of suitable fillers are fumed silicas, high-surface area precipitated silicas, silica aerogels as well as coarser silicas as diatomaceous earth, crushed quartz and the like. Other fillers may be used such as titanium oxide, ferric oxide, zinc oxide and fibrous fillers such as asbestos, fibrous glass and the like. Other additives such as pigments, antioxidants, ultra-violet absorbents and the like may be included in these compositions.

However, before applying a modified organopolysiloxane composition, it is necessary to first coat the zinc dust primed substrate with an acyloxysilane in order to obtain satisfactory bonding to the substrate. The acyloxysilanes may be represented by the formula:

$$R^a_{4-n}Si(OOCR^b)_n$$

in which $R^a$ is an organic group of from 1 to 6 carbon atoms; $R^b$ is an aliphatic group of from 1 to 3 carbon atoms and $n$ is an integer of from 1 to 3.

Examples of suitable acyloxy compounds are methyltriacetoxysilane, ethyltriacetoxysilane, vinyltriacetoxysilane, propyltricaetoxysilane, isopropyltriacetoxysilane, isopropyltripropoxysilane, methoxytriacetoxysilane, ethoxytriacetoxysilane, propoxytriacetoxysilane, amyltriacetoxysilane, amyloxytriacetoxysilane, phenyltriacetoxysilane, phenoxytriacetoxysilane, dimethyldiacetoxysilane, diethyldiacetoxysilane, diethoxydiacetoxysilane, dipropoxydiacetoxysilane, methylmethoxydiacetoxysilane, methylethoxydiacetoxysilane and the like.

It is preferred that the acyloxysilanes be applied in volatile hydrocarbon or chlorohydrocarbon solvents such as benzene, xylene, toluene, cyclohexane, heptane, methylene chloride, dichlorobenzene are generally applicable as well as dialkyl ethers of mono- and polyalkylene glycols. For most applications, either methylene chloride or toluene is preferred as the solvent.

Generally, the acyloxysilanes are applied as a solution containing from 2 to 20 percent by weight based on the weight of the solution. Especially good results have been achieved at these concentrations using methyltriacetoxysilane in methylene chloride.

The acyloxysilane solution may be applied over the zinc dust primed substrate in any suitable manner including brushing, dipping and spraying and dried before the application of the modified organopolysiloxane in order to insure complete evaporation of the solvent and thorough activation of the acyloxysilane in the presence of moisture. As would be expected, activation of the acyloxysilane proceeds at a slow rate at a low humidity. Where the drying process is accelerated by using a hot air oven, the primed article is allowed to set for at least 30 minutes after removal from the oven before the organopolysiloxane composition is applied.

The organopolysiloxane composition containing a catalyst and a cross-linking agent and a filler, where desired, is applied over the primed substrate and allowed to cure in the presence of ambient moisture.

The method of this invention can be employed to produce a wide range of products including silicone rubber coated metals for such uses as duct work in airplanes, as dampers in the sonar devices and as protective coatings of silicone rubber on plastic sheets and films. In addition, metals may be coated, laminated and bonded together with silicone rubber by the method of this invention.

The embodiments of this invention are further illustrated by the following examples in which all parts are by weight unless otherwise specified.

EXAMPLE 1

To a mixture consisting of about 50.6 parts of anhydrous ethylene glycol monoethyl ether and about 45 parts of ethyl polysilicate "40" is added about 3.4 parts of a 1.5 percent hydrochloric acid solution in distilled water and allowed to stand for about 24 hours.

To about 60 parts of the mixture prepared above is added about 40 parts of zinc dust having a particle size of from about 2 to 6 microns. The dispersion is applied by brushing to a metal substrate and dried for about 24 hours.

A curable silicone rubber composition, prepared by mixing about 5 parts of ethyl orthosilicate, about 77 parts or ion oxide and about 0.5 part of dibutyltin dilaurate to about 100 parts of a hydroxy-terminated polydimethylsiloxane having a viscosity of about 1,500 cs. is applied to the zinc coated metal substrates and cured at room temperature.

For purposes of comparison, a curable silicone rubber composition prepared in accordance with the procedure described above is applied to untreated metal substrates.

After curing the silicone rubber compositions for 7 days, the silicone rubber exhibited excellent adhesion to the zinc coated metal substrates while the silicone rubber composition did not adhere to the untreated metal substrates. The results of these experiments are illustrated in Table I.

TABLE I

| Metal Substrate | Adhesion of Silicone Rubber | |
|---|---|---|
| | Untreated Substrate | Zinc Coated Substrate |
| Steel, SAE 1020 | Good | Excellent. |
| Stainless steel, Type 304 | do | Do. |
| Copper | Poor | Good. |
| Brass | do | Do. |
| Aluminum, Type 7075 | None | Fair. |
| Titanium No. 811 | Poor | Do. |

EXAMPLE 2

An ethyl orthosilicate condensation having an $SiO_2$ content of 40 percent is heated to boiling with about 10 parts of methanol. The resultant disproportionated silicate material is hydrolyzed in the usual manner in mixed ethers. To about 40 parts of this composition is added about 60 parts of a zinc dust having a particle size of from about 2 to 6 microns. The dispersion is applied by brushing to a stainless-steel substrate and dried. The composition cured unusually fast which may be attributed to a conversion of a portion of the ethoxy groups carried by the condensate to methoxy groups.

A curable silicone rubber composition, prepared by mixing 5 parts of ethyl orthosilicate, about 77 parts of iron oxide and about 0.5 part of dibutyltin dilaurate to about 100 parts of a hydroxyl-terminated polydimethylsiloxane is applied to the zinc coated stainless-steel substrate and cured at room temperature. After curing for about 7 days, the silicone rubber exhibited excellent adhesion to the zinc coated stainless-steel substrate.

EXAMPLE 3

Modified organopolysiloxanes are prepared by grafting olefinic compounds to hydroxyl-terminated organopolysiloxanes in the presence of a free-radical initiator at a temperature of from about 60° to about 190° C. The unreacted olefinic compounds are removed at an elevated temperature by applying a vacuum of about 1 mm. Hg or less while continuing to heat for an additional hour. Several modified organopolysiloxanes prepared in accordance with this procedure are illustrated in Table II.

silicone rubber composition illustrated ahesion failure on zinc treated metal substrates.

EXAMPLE 5

A primer composition prepared by mixing about 12 parts of methyltriacetoxysilane with about 88 parts of methylene chloride is applied by brushing on the previously prepared zinc coated metal substrate and allowed to hydrolyze for about 45 minutes. A curable modified silicone rubber composition prepared by mixing about 3 parts of ethyl orthosilicate with about 0.3 part of dibutyltin dilaurate with about 33 parts of a hydroxyl-terminated modified organopolysiloxane prepared in accordance with the procedure described in Example 4 is applied to the methyltriacetoxy primed metal substrate and cured at room temperature. After curing for about 7 days, the modified silicone rubber exhibited excellent adhesion to the coated metal substrates.

In similar experiments, the curable modified silicone rubber composition is applied to untreated metal substrates in accordance with the procedure described above.

For purposes of comparison, metal substrates are treated with the primer composition prepared above and hydrolyzed for about 45 minutes. A curable modified sili-

TABLE II

| Example No. | Olefinic Compound | | Hydroxylated Fluid | | Free-Radical Initiator | | Reaction Conditions | | Final Polymer Viscosity, cs. |
|---|---|---|---|---|---|---|---|---|---|
| | Type | Parts | Viscosity, cs. | Parts | Type | Parts | Temp., °C. | Time, Hr. | |
| 3a | Acrylonitrile<br>Butyl acrylate | 14.6<br>35.4 | 1,900 | 50 | t-BP | 0.5 | 80 | 1.5 | 14,000 |
| 3b | Acrylonitrile<br>Butyl acrylate | 9.0<br>51.0 | 800 | 40 | t-BP | 0.5 | 80 | 1.7 | 7,800 |
| 3c | Acrylonitrile<br>Ethyl acrylate<br>Butyl acrylate | 9.1<br>2.9<br>48.0 | 800 | 40 | t-BP | 0.25 | 80 | 2.0 | 20,200 |
| 3d | Methacrylate | 50.0 | 400 | 50 | t-BP | 0.5 | 80 | 4.0 | 15,500 |
| 3e | Lauryl methacrylate | 70.0 | 400 | 30 | t-BP | 0.5 | 80 | 5.0 | 19,400 |
| 3f | Styrene<br>Butyl acrylate | 250.0<br>204.0 | 610 | 304 | t-BP | 2.0 | 125 | 24.0 | 14,500 |
| 3g | Vinyl chloride | 45.0 | 6,700 | 350 | t-BPer | 1.8 | 80 | 4.0 | 17,800 | t-BP=tertiary butyl peroxide.
t-BPer=tertiary butyl peroctoate.

EXAMPLE 4

To a mixture consisting of about 50.6 parts of anhydrous ethylene glycol monoethyl ether and about 45 parts of ethyl polysilicate (40 percent $SiO_2$) is added about 3.4 parts of a 1.5 percent HCl solution in distilled water and allowed to stand for about 24 hours.

To about 60 parts of the mixture prepared above is added about 40 parts of zinc dust having particles of from 2 to 6 microns in size. The dispersion is applied by brushing to metal substrates and dried for about 24 hours.

A curable modified silicone rubber composition, prepared by mixing 3 parts of ethyl orthosilicate and about 0.2 parts of dibutyltin dilaurate to about 33 parts of a hydroxyl-terminated modified polydimethylsiloxane prepared in accordance with the procedure described in Example 3a, is applied to the zinc coated metal substrates and cured at room temperature for 7 days. The modified cone rubber composition is then applied to the primed substrate and cured at room temperature.

The results of these tests are illustrated in Table III.

TABLE III

| Metal Substrate | Modified Organopolysiloxane, Example No. | Adhesion of Modified Silicone Rubber | | | |
|---|---|---|---|---|---|
| | | Untreated | Methyltriacetoxy treated | Zinc Coated | Zinc Coated and Methyltriacetoxysilane treated |
| Steel, SAE 1020 | 4a<br>4f | None<br>do | Fair<br>do | Fair<br>do | Excellent.<br>Do. |
| Stainless-steel, Type 304 | 4b<br>4c | None<br>do | Fair<br>do | Fair<br>do | Excellent.<br>Do. |
| Copper | 4a<br>4g | None<br>do | Poor<br>do | Fair<br>do | Good.<br>Do. |
| Brass | 4b<br>4e | None<br>do | Poor<br>do | Fair<br>do | Good.<br>Do. |
| Aluminum, Type 7075 | 4b<br>4f | None<br>do | Poor<br>do | Fair<br>do | Good.<br>Do. |
| Titanium, No. 811 | 4c<br>4d | None<br>do | Fair<br>do | Fair<br>do | Fair.<br>Do. |

EXAMPLE 6

When the following alkyl and alkoxy substituted acyloxysilanes are substituted for methyltriacetoxysilane, similar adhesion properties are obtained between modified silicone rubber and the metal substrates: diethoxydiacetoxysilane, ethyltriacetoxysilane, propyltriacetoxysilane, dipropyldiacetoxysilane, diphenoxydiacetoxysilane, phenoxytriacetoxysilane, diamyloxydiacetoxysilane, diamyldiacetoxysilane.

When the above examples are repeated utilizing other hydroxyl-terminated modified organopolysiloxanes in the presence of other catalysts, compositions are obtained which have substantially the same adhesion properties.

What is claimed is:

1. A method for bonding silicone rubber to a metal substrate which comprises applying to the surface of the substrate a primer composition comprising particulate zinc in an amount of from about 10 to 50% based on the weight of the primer composition and a condensate obtained from a tetraalkoxysilane of the formula:

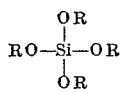

in which R represents a straight chain alkyl radical of not more than 4 carbon atoms, said condensate having an SiO₂ content upwards of 35 percent, water in an amount sufficient to provide 0.15 to 0.5 mole of $H_2O$ for each alkoxy group carried by said condensate and a solvent from the class consisting of monoalkylene glycol monoalkyl ethers, dialkylene glycol monoalkyl ethers, dialkylene glycol dialkyl ethers and monoalkylene glycol dialkyl ethers having boiling points within the range of 121° C. to 150° C. and flash points within the range of 46° C. to about 74° C., the solvent condensate ratio on a weight basis lying within the limits of 0.5:1 to 10:1, drying said primer composition and thereafter applying a room temperature curable organopolysiloxane to the dried surface.

2. The method of claim 1 wherein the primer composition is dried at a temperature of from about 50° C. up to about 450° C.

3. The method of claim 1 wherein the organopolysiloxane conforms to the formula:

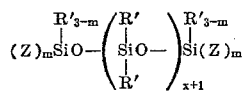

wherein R' is selected from the group consisting of monovalent hydrocarbon radicals, halogenated monovalent hydrocarbon radicals and cyanoalkyl radicals; Z is selected from the class consisting of hydroxyl and hydrolyzable groups; $m$ is an integer of from 1 to 3 and $x$ is an integer of from 0 to 20,000.

4. The method of claim 1 wherein a solution of a silane conforming to the formula:

$$R^a_{4-n}Si(OOCR^b)_n$$

wherein $R^a$ is an organic group of from 1 to 6 carbon atoms; $R^b$ is an aliphatic group of from 1 to 3 carbon atoms and $n$ is an integer of from 1 to 3, is interposed between the primer composition and a modified organopolysiloxane.

5. The method of claim 4 wherein the modified organopolysiloxane conforms to the formula:

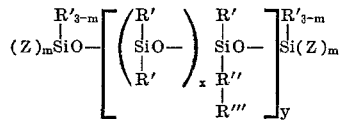

in which R' is selected from the group consisting of monovalent hydrocarbon radicals, halogenated monovalent hydrocarbon radicals and cyanoalkyl radicals; R'' is a divalent hydrocarbon radical; R''' is a polymeric organic radical linked to R'' by a carbon-to-carbon linkage; Z is selected from the class consisting of hydroxyl and hydrolyzable groups; $m$ is an integer of from 1 to 3; $x$ is an integer of from 0 to 20,000 and $y$ is an integer of from 1 to 500.

6. The method of claim 3 wherein Z is a hydrolyzable group.

7. The method of claim 3 wherein Z is a hydroxyl group.

8. The method of claim 7 wherein the organopolysiloxane is reacted with a silane conforming to the formula:

$$X_{4-t}SiY_t$$

wherein X is a relatively inert group selected from the class consisting of alkyl, alkoxy and aryl groups; Y is selected from the class consisting of acyloxy, oximo, alkoxy, aminooxy, halogen and phosphato groups and $t$ is an integer of from 3 to 4.

9. The method of claim 5 wherein Z is a hydroxyl group.

10. The method of claim 9 wherein the organopolysiloxane is reacted with a silane conforming to the formula:

$$X_{4-t}SiY_t$$

in which X is selected from the class consisting of alkyl, alkoxy, and aryl groups; Y is selected from the class consisting of acyloxy, oximo, alkoxy, aminooxy, halogen and phosphato groups and $t$ is an integer of from 3 to 4.

11. The method of claim 7 wherein the organopolysiloxane contains a curing agent and a catalyst.

12. The method of claim 11 wherein the curing agent is selected from the group consisting of polyalkoxysilanes and polyalkoxysiloxanes.

13. The method of claim 11 wherein the curing agent is ethyl silicate and the catalyst is dibutyltin butoxychloride.

14. The method of claim 7 wherein the silane is a methyltriacetoxysilane.

15. The method of claim 10 wherein the silane is a methyltriacetoxysilane.

16. The method of claim 9 wherein the organopolysiloxane contains a curing agent and a catalyst.

17. The method of claim 16 wherein the curing agent is selected from the group consisting of polyalkoxysilanes and polyalkoxysiloxanes.

18. The method of claim 16 wherein the curing agent is ethyl silicate and the catalyst is dibutyltin butoxychloride.

19. An article of manufacture having silicone rubber bonded to a substrate which comprises a metal substrate, a room temperature curable organopolysiloxane and interposed between the substrate and the organopolysiloxane is a primer composition comprising particulate zinc in an amount of from about 10–50% based on the weight of the primer composition and a condensate obtained from a tetraalkoxysilane of the formula:

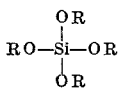

in which R represents a straight chain alkyl radical of not more than 4 carbon atoms, said condensate having an SiO₂ content upwards of 35 percent, water in an amount sufficient to provide 0.15 to 0.5 mole $H_2O$ for each alkoxy group carried by said condensate and a solvent from the class consisting of monoalkylene glycol monoalkyl ethers, dialkylene glycol monoalkyl ethers, dialkylene glycol monoalkyl ethers, dialkylene glycol monoalkyl ethers, dialkylene glycol dialkyl ethers and monoalkylene glycol dialkyl ethers having boiling points within the range of 121° C. to 150° C. and flash points within the range of 46° C. to about 74° C.

20. The article of claim 19 wherein the organopolysiloxane is a modified organopolysiloxane and interposed between the zinc primer composition and the modified organopolysiloxane is a silane conforming to the formula:

$$R^a_{4-n}Si(OOCR^b)_n$$

in which $R^a$ is an organic group of from 1 to 6 carbon atoms; $R^b$ is an aliphatic group of from 1 to 3 carbon atoms and $n$ is an integer of from 1 to 3.

References Cited

UNITED STATES PATENTS 2,643,964 6/1953 Smith-Johannsen ____ 161—206
2,744,878 5/1956 Smith-Johannsen ____ 161—207
3,318,717 5/1967 Simpson _____ 117—72

ALFRED L. LEAVITT, Primary Examiner

CAMERON K. WEIFFENBACH, Assistant Examiner

U.S. Cl. X.R.

117—72, 75; 161—206, 207

UNITED STATES PATENT OFFICE
CERTIFICATE OF CORRECTION

Patent No. 3,505,099                                        April 7, 1970

Charles George Neuroth

It is certified that error appears in the above identified patent and that said Letters Patent are hereby corrected as shown below:

Column 1, line 59, "future" should read -- further --. Column 2, line 28, "tran" should read -- than --; line 60, "gycol" should read -- glycol --. Column 5, line 64, "$OSiX_{4-t}\Delta_{t-1}$" should read -- $OSiX_{4-t}Y_{t-1}$ --. Column 6, line 6, "vallen-" should read -- valen- --. Column 8, line 44, "or ion" should read -- of iron --; line 45, "hydroxy" should read -- hydroxyl --. Column 12, lines 65 to 67, cancel "dialkylene glycol monoalkyl ethers, dialkylene glycol monoalkyl ethers,".

Signed and sealed this 2nd day of March 1971.

(SEAL)
Attest:

EDWARD M. FLETCHER, JR.
Attesting Officer
                                                   WILLIAM E. SCHUYLER, JR.
                                                   Commissioner of Patents